United States Patent Office

3,553,140
Patented Jan. 5, 1971

3,553,140
PERBORATE CONTAINING CONCENTRATES
Kurt Lindner and Elfriede Eichler, Berlin, Germany, assignors to Henkel & Cie G.m.b.H., Dusseldorf, Germany, a corporation of Germany
No Drawing. Filed May 26, 1967, Ser. No. 641,465
Claims priority, application Germany, Aug. 26, 1966,
H 60,349
Int. Cl. C11d 7/56
U.S. Cl. 252—99         6 Claims

ABSTRACT OF THE DISCLOSURE

Perborate containing concentrates suitable for use as bleaching and oxidizing agents and characterized by their prolonged shelf life are disclosed having the following composition:

(a) sodium perborate, and
(b) potassium hydroxide and/or non-oxidizable salt of an inorganic polybasic acid wherein the total amount of potassium present in the concentrate in the form of its compounds amounts to 0.5 to 20 times the total amount of sodium present in the concentrate in the form of its compounds. The concentrates may be in the form of dry solids such as powders, granulates, or in the form of aqueous concentrates, the dry solid concentrates being employed in the preparation of the aqueous concentrates.

The aqueous concentrates prepared from the solid concentrates or as hereinafter set out have the following composition:

(a) 3 to 40% by weight of perborate ($NaBO_2 \cdot H_2O_2 \cdot 3H_2O$),
(b) 0.3 to 10 parts by weight of potassium hydroxide and/or non-oxidizable salt of an inorganic polybasic acid for each part by weight of perborate ($NaBO_2 \cdot H_2O_2 \cdot 3H_2O$), and
(c) water wherein the total amount of potassium present in the concentrate in the form of its compounds amounts to 0.5 to 20 times the total amount of sodium present in the concentrate in the form of its compounds.

---

The present invention relates to aqueous perborate concentrates containing dissolved perborate in an amount substantially in excess of the solubility of perborate in water and to a method for producing and using such concentrates.

Commercial sodium perborate (sodium metaborate perhydrate) having the formula $NaBO_2 \cdot H_2O_2 \cdot 3H_2O$ is an oxidant and bleach that has a widespread range of applications and which, when dissolved in water, breaks down into sodium metaborate and hydrogen peroxide providing the combined action of the oxygen-yielding hydrogen peroxide with that of the alkalinely reacting metaborate. Because of the poor solubility of sodium perborate in water, which amounts to about 1.34 g. per 100 ml. at 15° C., it is not possible to produce aqueous solutions of sodium perborate in concentrations permitting its economical use.

For many applications, however, especially in the laundry, textile bleaching, metal and cosmetic industries, it is desirable to have concentrated solutions or pastes containing the oxidant, which can be added in that form to the treatment baths. Aqueous pastes and suspensions of sodium perborate have not proved capable of satisfying the requirements in connection with the use of such pastes, or suspensions, because even if the settled perborate is shaken up or stirred up before use, there is no assurance that the aqueous perborate suspension taken from the supply tank as a constant, i.e., the same perborate content. Furthermore, the perborate dissolves slowly in the treatment bath or wash water. Therefore, particularly in industrial textile processing and in laundries, hydrogen peroxide solutions of high concentrations ranging from about 30 to 60% are used, despite the extreme caution required in handling them.

An object of the present invention is to provide perborate concentrates which when introduced into water will provide aqueous preparations containing perborate in solution in a quantity substantially greater than the solubility of the perborate in water.

It is an object of the present invention to provide aqueous perborate containing concentrates, wherein the perborate present in solution is substantially greater than the solubility of the perborate in water.

A further object of the invention is to provide aqueous perborate containing concentrates suitable for use as bleaching and oxidizing agents.

Another object is to provide a process for the production of aqueous perborate containing concentrates, wherein the perborate is present in an amount permitting its economical use in industry.

Still other objects and advantages of the invention will be apparent from the following description of the aqueous perborate concentrates and of the method of making and using them in certain of its particularly useful applications and modifications which are given for purposes of illustration only without being intended to limit the invention.

In accordance with the invention it has now been found that solid perborate containing compositions characterized by prolonged shelf life which can be used to provide aqueous concentrates containing dissolved perborate in an amount substantially in excess of the solubility of perborate in water and which can be used as bleaching agents and oxidants are provided by concentrates of the following composition:

(a) 3 to 40% by weight and preferably 5 to 30% by weight of perborate (as $NaBO_2 \cdot H_2O_2 \cdot 3H_2O$), and
(b) at least 0.3 and preferably 0.5 to 10 parts by weight of potassium hydroxide and/or non-oxidizable potassium salt of an inorganic polybasic acid, for each part by weight of perborate (as $NaBO_2 \cdot H_2O_2 \cdot 3H_2O$)

The total amount of potassium present in the concentrates in the form of the above-named compounds is at least half as great as the total amount of sodium present in the concentrate in the form of its compounds, and amounts preferably to from 1 to 16 times, and most preferably to from 2 to 10 times this amount, a potassium-to-sodium ratio of 20:1 usually not being exceeded.

The aqueous concentrates have the following composition:

(a) 3 to 40% by weight and preferably 5 to 30% by weight of perborate (as $NaBO_2 \cdot H_2O_2 \cdot 3H_2O$), (b) at least 0.3 and preferably 0.5 to 10 parts by weight of potassium hydroxide and/or non-oxidizable potassium salt of an inorganic polybasic acid parts by weight of perborate (as $NaBO_2 \cdot H_2O_2 \cdot 3H_2O$) and (c) water The total amount of potassium present in the concentrates in the form of the above-named compounds is at least half as great as the total amount of sodium present in the concentrate in the form of its compounds, and amounts preferably to from 1 to 16 times, and most preferably to from 2 to 10 times this amount, a potassium-to-sodium ratio of 20:1 usually not being exceeded.

The extent of the improvement of the solubility of the perborate that is achieved according to the invention differs from case to case. It depends on the potassium compound used, on its concentration, and on the ratio of the potassium compound to the perborate.

The sodium perborate used is preferably the commercial product having the approximate composition: $NaBO_2 \cdot H_2O_2 \cdot 3H_2O$, although a partially dehydrated perborate may be used, or one that has been dehydrated until its composition is $NaBO_2 \cdot H_2O_2$.

In addition to potassium hydroxide, there can be used in accordance with the invention, for example, the potassium salts of the following polybasic, non-oxidizable inorganic acids: sulfuric acid, ortho-, pyro- or polyphosphoric acid, carbonic acid or silicic acid. Where acid potassium salts of these acids exist, they can be used also. Sodium-potassium double salts can also be used as long as they do not change the ratio of potassium to sodium to an undesirable one.

Of these salts, dipotassium dihydrogen pyrophosphate, tetrapotassium pyrophosphate and pentapotassium tripolyphosphate have a particular practical importance to the extent that the concentrates manufactured with these salts are especially stable against oxygen loss. The pyrophosphates are superior to the tripolyphosphates in this respect. If the presence of tripolyphosphate is desirable for a special reason, as for example the fact that the concentrates are going to be used as detergents or bleaches for textiles, the tripolyphosphate should be present advantageously in a quality that does not exceed two-thirds of the total amount of pyro- and tripolyphosphate.

The aqueous perborate concentrates of the invention are prepared by combining the components, perborate, potassium compound and water, in any sequence. It has been found to be advantageous to aid the dissolution by stirring and/or by slight warming. The perborate can be dissolved in an aqueous solution of the potassium compound to particular advantage, the concentration of the potassium compound varying within wide limits, i.e., from about 2% potassium compound to the limit of solubility at the temperature concerned. It is preferable to work with 5% to 50% solutions. These concentration data apply accordingly also to cases in which a solid mixture of perborate and potassium compound is dissolved in water.

In general, the perborate is dissolved at temperatures of from 5° C. to 40° C. At temperatures below 15° C. and especially 10° C., the solubility of the components is so slight that sometimes it is impossible to arrive at a completely clear solution. Solubility and rate of dissolution are improved by temperature elevation, but at the same time the danger of the decomposition of the perborate increases, which again depends upon the presence of acid, neutral or alkaline reacting compounds, decomposition catalysts for per compounds, which may be present as impurities, or on the presence of per stabilizers. Depending on these circumstances, the mixture may be heated to a greater or lesser extent during dissolution, although temperatures of up to 30° C. will usually suffice.

Potassium salts such as those which are produced from the corresponding polybasic acids by partial or complete neutralization and which have an acid, neutral or alkaline reaction, can be used in the process of the invention. It is thus possible to reduce or raise the pH values of the perborate solutions and thereby to control the stability of the perborate. The pH of the aqueous concentrates according to the invention can range from 3 to 14. In products intended for washing and bleaching in the household and in industries, pH values ranging from 6 to 12 and preferably from 7 to 10.5 have been found to be most desirable. However, the stability of the preparations apparently does not depend on the pH alone, but also on the potassium compound that is used for the adjustment of the pH. In this connection, more stable solutions are obtained when the sulfates, tripolyphosphates and pyrophosphates of potassium are used than with the carbonates or with potassium hydroxide.

The preparations according to the invention may contain, in addition to the substances set out above, other substances which are capable of supporting the action of the perborate in the oxidation and bleaching process involved. These may be inorganic or organic dissolved, emulsified liquid or suspended solid substances. They include preferably the known stabilizers for per compounds. However, bactericides or fungicides, anti-corrosives, optical brighteners, perfumes and dyes can also be incorporated into the concentrates.

Whenever the oxidizers and bleaches according to the invention contain emulsified or suspended components, it is recommended that thickeners or other emulsion or suspension stabilizers, such as the water-soluble salts of polyacrylic acid or polymethacrylic acid be additionally incorporated into the concentrates.

It has been found that the water-soluble salts of those carboxyl-group-containing vinyl polymers are most advantageously used, the 1% aqueous solutions, of which while being free of other dissolved substances, especially of other electrolytes, have a viscosity of at least 5000 and preferably from 7000 to 100,000 cps. at a pH of 7 and a temperature of 20° C.

These carboxyl-group-containing polymers are obtained by the polymerization of $\alpha$-$\beta$-unsaturated monocarboxylic acids having 3 to 5 carbon atoms. Acrylic acid, methacrylic acid, $\alpha$-chloracrylic acid and $\alpha$-cyanacrylic acid are instances of preferable monomers. The polymerization of these monomers is carried out in the presence of slight amounts of cross-linking agents, i.e., polymerizable substances containing at least two terminal olefin groups. These include many different hydrocarbons, esters, ethers or amides, such as for example divinylbenzene, divinylnaphthaline, polybutadiene, ethylene glycol diacrylate, methylene-bis-acrylamide, allylacrylate, alkenyl ethers of sugars or sugar alcohols, acid anhydrides, etc. The polymerization can be conducted under conditions in which the free carboxyl groups form anhydrides. These anhydride groups are split again in the manufacture of the suspensions according to the invention.

In the polymerization process, the cross-linking results in a considerable increase in the molecular weight of the products. However, it may proceed only to the point that the polymers are perfectly soluble in the form of their alkali salts and the viscosity of the 1% aqueous solution of the sodium salts is within the claimed range. The viscosities are based on solutions in distilled water, i.e., without the addition of other soluble substances, inasmuch as the latter would affect the viscosities and are determined using a Brookfield Viscosimeter.

These polymers are not only excellent suspension stabilizers and thickeners, but they also stabilize the per compounds.

The consistency of the preparations depends both on the quantity of the suspended components contained therein, and on the viscosity of the aqueous phase as well. In practice, pourable suspensions are often preferred over paste preparations because the former are easier to measure out and mix into aqueous treatment solutions.

The concentrates according to the invention can also contain surfactants, particularly non-oxidizable surfactants, i.e., those that are free of olefinic double bonds or other oxidizable groups.

The structure of many of the surfactants that are usable according to the invention comply with the general principle of a hydrophobic radical linked to a hydrophilic group in one molecule. For the purposes of the invention, non-oxidizable surfactants are satisfactory which have mostly saturated radicals containing preferably 10 to 18 carbon atoms and anionic or nonionic hydrophilic groups. The saturated hydrophobic radicals are preferably of an aliphatic nature and are derived from fatty acids or fatty alcohols.

The anionic surfactants of a predominantly saturated nature include, for instance, alkyl sulfates or alkyl ether sulfates, which are obtained, for example, from products of the addition of ethylene oxide and/or propylene oxide onto fatty alcohols; alkyl sulfonates, alkyl aryl sulfonates, and products of the condensation of fatty acids with oxycarboxylic acids, oxysulfonic acids, aminocarboxylic acids, or aminosulfonic acids. In these anionic surfactants, the alkyl or acyl radical preferably contains 10 to 18 carbon atoms.

The non-ionic surfactants include, for example, the products of the addition of ethylene oxide or ethylene oxide onto fatty alcohols, fatty acids, alkyl phenols, fatty acid amides, fatty acid alkylolamides and similar non-oxidizable compounds having reactive hydrogen. The number of ethylene glycol radicals present in the molecule can vary between 4 and 20 and preferably between 5 and 15, and should be sufficient to give the products turbidity points of at least 20° C. and preferably at least 40° C.

Another group of non-ionic surfactants is usable for the purposes of the invention, which differ from those described hitherto in the nature of the hydrophobic radical and by the presence of a plurality of hydrophilic groups in one molecule. These non-ionic surfactants are block polymers which are obtained by the addition of ethylene oxide onto water-insoluble polypropylene glycols of high molecular weight or onto water-insoluble products of high molecular weight formed by the reaction of propylene oxide and diamines. These last-named surfactants have been described in greater detail in the literature of cf. K. Lindner: "Tenside, Textilhilfsmittel, Waschrohstoffe," 2nd ed., Stuttgart 1964, pp. 1052–1056.

As non-ionic surfactants, there may also be used aminoxides of high molecular weight.

Of these surfactants, preference is given to those which are highly salt-resistant and which also stabilize the active oxygen of the sodium perborate.

Many of the above-listed surfactants have a pronounced sudsing ability, which can be increased or diminished by the suitable combination of different surfactants. Foam stabilizers or foam inhibitors can also be added.

The additional use of non-oxidizable or poorly oxidizable hydrotropic substances has also proved advantageous. Cyanamide, dicyandiamide or urea are suitable as such substances, and so are low aryl or alkylaryl sulfonates, such as the water-soluble salts of benzenesulfonic, toluenesulfonic or xylenesulfonic acid.

In addition, other additives customarily used for the particular applications may be present, such as germicides or fungicides, anti-corrosives, optical bleaches, perfumes, colorants, etc.

These adjuvants and additives may be present in the form of salts of inorganic or organic acids and may be used in the form of their sodium or potassium salts. The sodium and/or potassium introduced in this form is included in the above-defined ratio of potassium to sodium.

As the concentrates of the invention can also be made by the dissolution of mixtures of the dry powdered or granulated components in water, such dry mixtures can be marketed in the form of powders, granulates, tablets, balls or other molded forms. The hygroscopic nature of the various potassium compounds must be provided for by the appropriate choice of packaging material. These dry preparations can be used to prepare stock solutions which are then used as soon as possible for many different purposes. This latter possibility is important particularly in the case of preparaitons which gradually yield the active oxygen even at room temperature. The solid mixtures have an excellent shelf life, whereas the aqueous concentrates that are prepared therefrom as stock solutions combine the advantages of the concentrate in liquid form with those of a gradual release of oxygen which is advantageous for many applications.

The perborate concentrates according to the invention are usable for many different purposes in industry and in the household. Examples include the washing and/or bleaching of textiles in the household and in industry, the bleaching of textiles or the materials from which they are made in the textile industry, oxidation processes in printing and dyeing, the conversion of starch, disinfection and sterilization, cosmetic uses, especially in the setting of permanent waves and preferably in cold-setting, the preparation of oxygen baths, use as adjuvants in baking, use in the manufacture of building materials, such as porous plaster and concrete, the treatment of metal surfaces, the bleaching of straw, wood, straw pulp, wood pulp, ivory and other such natural materials, the bleaching of oils, fats and waxes, use in photographic developing processes, and for use as catalysts in the polymerization of organic compounds, especially in the manufacture of plastic or plastic foreproducts. For all these purposes, the possibility of using solutions or pastes of perborate of a higher than usual concentration has proved to be advantageous.

The following examples will illustrate the invention without limiting the latter thereto.

In the examples, the amounts are given as parts by weight and percentages by weight. The caustic potash solutions and the potassium salt solutions used were aqueous solutions. Unless otherwise specified, the preparations were manufactured and stored at a temperature of about 20° C.

For the production of the preparations described in Examples 11 to 13, a slightly cross-linked vinyl polymer was used in the form of the free acid-containing carboxyl groups, which was capable of swelling in water and had an acid number of 754. In order to determine the viscosity of a 1% aqueous solution of the sodium salt of the polymer, a corresponding amount of the free acid was steeped in distilled water; thereafter somewhat less than the amount of dilute caustic soda solution required for neutralization was added and the batch resulting occasionally stirred, whereupon the polymer dissolved. The solution was then adjusted to a pH of 7 by the addition of more caustic soda solution. (In preparing such solutions it is advantageous to check the pH after about 30 minutes of standing. In the event it should have diminished to any extent, lye should be added and a further pH measurement made after another 30 minutes.) The aqueous solution which is thusly obtained had a viscosity of about 50,000 cps. measured at 20° C. in the Brookfield "RVT" rotation viscosimeter using the No. 6 spindle.

EXAMPLE 1

5 parts of commercial sodium perborate were dissolved with stirring in 80 parts of a 10% potassium sulfate solution. The clear aqueous solution thus prepared had a pH of 10. It released its active oxygen slowly and uniformly. After 24 hours, approximately 77% of the original amount of active oxygen was still present, and after 48 hours about 49%.

EXAMPLE 2

10 parts of sodium perborate were dissolved with stirring in 80 parts of an approximately 25% aqueous solution of potassium bicarbonate. The clear solution thus prepared had a pH of 8.0. It released all of its active oxygen within 24 hours, the release of the oxygen proceeded uniformly throughout this period.

EXAMPLE 3

15 parts of sodium perborate were dissolved with stirring in 80 parts of a 40% potassium carbonate solution. The clear solution thus obtained had a pH of 9.7. The active oxygen was released from the solution rapidly. Only about 28% of the active oxygen was still present after 24 hours and only about 10% after 48 hours.

It was possible to produce the same type of solution using the same quantities as above set out and by dissolving a mixture of the same salts in water.

EXAMPLE 4

20 parts of sodium perborate were dissolved with stirring in 80 parts of a 50% solution of tetrapotassium pyrophosphate. The clear solution had a pH of 10.3. In spite of this relatively high pH, the solution released its active oxygen more slowly than the solutions of Examples 1–3. After 24 hours, about 98% of the original amount of active oxygen was still present, after 48 hours about 97% and after 72 hours about 92%.

EXAMPLE 5

If in the same procedure as set out in Example 4, the tetrapotassium pyrophosphate solution was replaced by the same quantity of a 50% solution of pentapotassium tripolyphosphate, a clear solution was obtained having a pH of 10.1. This solution, too, released its active oxygen more slowly than the solutions of Examples 1–3. After 24 hours about 88% of the active oxygen was still present, and after 38 hours about 83%.

EXAMPLE 6

If in the same procedure as described in Example 4, the solution of tetrapotassium pyrophosphate was replaced by the same amount of a 50% solution of acid potassium pyrophosphate (dipotassium dihydrogen diphosphate), up to 46 parts of sodium perborate could be dissolved in 80 parts of this solution. A clear solution was thereby obtained having a pH of 6.4 and which had a very good storage life.

The same kind of solution using the same quantities of sodium perborate and tetrapotassium pyrophosphate, as above, was also produced by dissolving the mixture in water.

EXAMPLE 7

20 parts of sodium perborate were dissolved with stirring in 80 parts of an approximately 19% solution of monopotassium orthophosphate. The clear solution thus obtained had a pH of 7.2. It released its active oxygen slowly and very regularly. After 24 hours about 96.5% of the active oxygen was still present, and after 48 hours 95.5%.

EXAMPLE 8

20 parts of sodium perborate were dissolved with stirring in 80 parts of a 50% solution of dipotassium orthophosphate at room temperature. The clear solution thus obtained had a pH of 10.4. In spite of this high pH, the active oxygen was released slowly. After 24 hours of storage at room temperature 96% of the active oxygen was still present.

EXAMPLE 9

9 parts of sodium perborate were dissolved with stirring in 80 parts of a 50% solution of tripotassium orthophosphate at room temperature. The pH of the clear solution thereby obtained amounted to 11.5. The active oxygen was released somewhat more rapidly, but very regularly in spite of the high alkalinity. After 24 hours 79% of the original amount of active oxygen was still present, and after 48 hours 62% was still present.

The same type of solution and using the same quantities of salts as set out above, was produced by dissolving a mixture of the salts in water.

EXAMPLE 10

20 parts of sodium perborate were dissolved in 80 parts of a 50% caustic potash solution at room temperature, with stirring. The clear solution thus obtained released its active oxygen at a moderate to rapid rate and very regularly in spite of its high alkalinity. After 24 hours, about 51% of the active oxygen was still present, after 48 hours about 27% and after 72 hours about 13%.

EXAMPLE 11

78 parts of a 50% solution of tetrapotassium pyrophosphate were gradually stirred into a mixture of 20 parts of sodium perborate and 2 parts of a carboxyl group containing polymer as above described at room temperature. The polymer dissolved after passing through a process of steeping in the aqueous phase in which the perborate was at first suspended. Gradually the opaque solution was converted into a transparent solution which upon standing thickened into a paste characterized by a long storage life. On account of the heavy consistency of the paste, its pH could not be easily measured. A 1% solution of this paste in distilled water had a pH of 9.5. After 3 weeks of storage at room temperature, the paste still contained 97.4% of its initial active oxygen content.

EXAMPLE 12

If the same general procedure as set out in Example 11 were followed and the neutral potassium pyrophosphate was replaced by the same amount of pentapotassium tripolyphosphate, the suspension first formed thickened more slowly, so that the pH of the concentrate could be determined and was found to be 8.35. A 1% aqueous solution of the paste had a pH of 9.2. This paste, too, was very stable in storage and after 3 weeks still contained 92% of the active oxygen originally present.

EXAMPLE 13

A mixture of 15 parts of sodium perborate and 2 parts of the carboxyl group containing polymer as described was stirred together with 60 parts of a 50% solution of tetrapotassium pyrophosphate. The polymer dissolved after passing through a period of steeping in the aqueous phase. After some time, a transparent solution developed, which was mixed with 23 parts of a solution of 13 parts by weight of water and 10 parts of a product obtained by the addition of 10 moles of ethylene-oxide onto 1 mole of nonylphenol. After a period of standing, a paste formed a 1% solution of which had a pH of approximately 9.5. Following a storage period of 3 weeks, 99% of the original amount of active oxygen was still present.

EXAMPLES 14–23

Sometimes it is desired to prepare aqueous solutions which contain less active oygen than those of the foregoing examples, but whose perborate content is higher than that of an aqueous sodium perborate solution that is saturated at 20° C. In that case, as it appears from the formulas listed in the following tables, much less potassium hydroxide or potassium salts of polybasic inorganic acids are needed. At the same time, the salt mixtures can be dissolved in water, or the sodium perborate can be dissolved in a solution of the particular potassium compound.

TABLE I

Composition of the preparations of Examples 14-23

| Example No: | Na perborate | Potassium compound | $H_2O$ | Solution |
|---|---|---|---|---|
| 14 | 3.5 | $2K_2SO_4$ | 98 | 103.5 |
| 15 | 4.0 | $2K_4P_2O_7$ | 98 | 104 |
| 16 | 4.0 | $2K_5P_3O_{10}$ | 98 | 104 |
| 17 | 4.5 | $2K_2H_2P_2O_7$ | 98 | 104.5 |
| 18 | 5.0 | 2KOH | 98 | 105 |
| 19 | 7.0 | $5K_2SO_4$ | 95 | 107 |
| 20 | 6.0 | $5K_4P_2O_7$ | 95 | 106 |
| 21 | 4.5 | $5K_5P_3O_{10}$ | 95 | 194.5 |
| 22 | 8.0 | $5K_2H_2P_2O_7$ | 95 | 108 |
| 23 | 9.0 | 5KOH | 95 | 109 |

TABLE II

Weight ratios of potassium hydroxide or potassium salt of polybasic inorganic acid (= potassium compound) to sodium perborate (= PB) and of total potassium to total sodium in the preparations of Examples 1-23

| Example No.: | Weight ratio potassium compound to PB | K:Na |
|---|---|---|
| 1 | $8K_2SO_4:5PB=160$ | 4.81 |
| 2 | $20KHCO_3:10PB=2.00$ | 5.23 |
| 3 | $32K_2CO_3:15PB=2.14$ | 8.08 |
| 4 | $40K_4P_2O_7:20PB=2.00$ | 6.34 |
| 5 | $40K_5P_3O_{10}:20PB=2.00$ | 7.51 |
| 6 | $40K_2H_2P_2O_7:46PB=0.87$ | 1.79 |
| 7 | $15.2KH_2PO_4:20PB=0.76$ | 1.46 |
| 8 | $40K_2HPO_4:20PB=2.00$ | 7.69 |
| 9 | $40K_3PO_4:9PB=4.45$ | 16.43 |
| 10 | $40KOH:20PB=2.00$ | 9.33 |
| 11 | $39K_4P_2O_7:20PB=1.95$ | 6.18 |
| 12 | $39K_5P_3O_{10}:20PB=1.95$ | 7.32 |
| 13 | $30K_4P_2O_7:15PB=2.00$ | 6.34 |
| 14 | $2K_2SO_4:3.5PB=0.57$ | 1.72 |
| 15 | $2K_4P_2O_7:4PB=0.50$ | 1.58 |
| 16 | $2K_5P_3O_{10}:4PB=0.50$ | 1.88 |
| 17 | $2K_2H_2P_2O_7:4.5PB=0.44$ | 0.91 |
| 18 | $2KOH:5PB=0.40$ | 1.87 |
| 19 | $5K_2SO_4:7PB=0.71$ | 2.15 |
| 20 | $5K_4P_2O_7:6PB=0.83$ | 2.64 |
| 21 | $5K_5P_3O_{10}:4.5PB=1.11$ | 4.17 |
| 22 | $5K_2H_2P_2O_7:8PB=0.62$ | 1.29 |
| 23 | $5KOH:9PB=0.56$ | 2.59 |

We claim:

1. A dry powder-form perborate bleaching composition consisting essentially of:
   (a) 3 to 40 weight percent of $NaBO_2 \cdot H_2O \cdot 3H_2O$,
   (b) a potassium compound selected from the group consisting of the hydroxide, carbonate, sulfate, orthophosphate, pyrophosphate and polyphosphate, the amount of potassium in said concentrate in the form of its compounds being in the range of 0.5 and 20 times the amount of sodium present, calculated as $NaBO_2 \cdot H_2O_2 \cdot 3H_2O$, and said concentrate being capable of ready solution in water to form an aqueous concentrate.

2. The bleaching composition of claim 1 wherein the total weight of potassium with respect to the total weight of sodium is in the ratio of 1:1–16:1 (K:Na).

3. An aqueous perborate concentrate consisting essentially of:
   (a) in the range of 3 to 40 weight percent of perborate, calculated as $NaBO_2 \cdot H_2O_2 \cdot 3H_2O$;
   (b) in the range of 0.3 to 10 parts by weight, per part of said perborate, of a potassium compound selected from the group consisting of the hydroxide, carbonate, bicarbonate, sulfate, orthophosphate, pyrophosphate and polyphosphate, the amount of potassium in said concentrate in the form of its compounds being in the range of 0.5 to 20 times the amount of sodium present, calculated as $NaBO_2 \cdot H_2O \cdot 3H_2O$;
   (c) the balance water, the pH of said concentrate being in the range of 3 to 14.

4. The concentrate of claim 3 wherein the total weight of potassium with respect to the total weight of sodium is in the ratio of 1:1–16:1 (K:Na).

5. The concentrate according to claim 3 having a pH value of from 6 to 11 and wherein said potassium salt of a polybasic acid consisting essentially of at least one member selected from the group consisting of dipotassium dihydrogen pyrophosphate, tetrapotassium pyrophosphate and pentapotassium tripolyphosphate wherein the quantity of pentapotassium tripolyphosphate, if present, amounts to at the most ⅔ of the total weight of said salts.

6. The concentrate of claim 4 wherein said ratio is 2:1–10:1 (K:Na).

References Cited

UNITED STATES PATENTS 3,413,221  11/1968  Gotte et al. ———— 282—99X

MAYER WEINBLATT, Primary Examiner

U.S. Cl. X.R.

252—94, 95, 186

PO-1050
(5/69)

UNITED STATES PATENT OFFICE
CERTIFICATE OF CORRECTION

Patent No. 3,553,140            Dated January 5, 1971

Inventor(s) Kurt Lindner and Elfriede Eichler

It is certified that error appears in the above-identified patent and that said Letters Patent are hereby corrected as shown below:

Col. 3, line 46, "quality" should be --quantity--;

Col. 6, line 16, preparaitons" should be --preparations--;

Col. 7, line 11, "8.0" should be --8.8--.

Signed and sealed this 6th day of April 1971.

(SEAL)
Attest:

EDWARD M. FLETCHER, JR.          WILLIAM E. SCHUYLER, JR.
Attesting Officer                    Commissioner of Patents